US011938765B2

(12) United States Patent
Lee et al.

(10) Patent No.: US 11,938,765 B2
(45) Date of Patent: Mar. 26, 2024

(54) HYBRID TIRE CORD WITH STRONG ADHESION TO RUBBER AND EXCELLENT FATIGUE RESISTANCE, AND METHOD FOR MANUFACTURING THE SAME

(71) Applicant: KOLON INDUSTRIES, INC., Seoul (KR)

(72) Inventors: Min Ho Lee, Seoul (KR); Ok Hwa Jeon, Seoul (KR); Jongha Yim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 414 days.

(21) Appl. No.: 17/285,909

(22) PCT Filed: Dec. 27, 2019

(86) PCT No.: PCT/KR2019/018556
§ 371 (c)(1),
(2) Date: Apr. 16, 2021

(87) PCT Pub. No.: WO2020/138996
PCT Pub. Date: Jul. 2, 2020

(65) Prior Publication Data
US 2021/0370720 A1  Dec. 2, 2021

(30) Foreign Application Priority Data

Dec. 27, 2018  (KR) .................. 10-2018-0170216

(51) Int. Cl.
*B60C 9/00* (2006.01)
*D02G 3/48* (2006.01)
*D02G 3/28* (2006.01)

(52) U.S. Cl.
CPC ............ *B60C 9/005* (2013.01); *B60C 9/0042* (2013.01); *D02G 3/28* (2013.01); *D02G 3/48* (2013.01); *B60C 2009/0092* (2013.01); *D10B 2505/022* (2013.01)

(58) Field of Classification Search
None
See application file for complete search history.

(56) References Cited

U.S. PATENT DOCUMENTS

| | | | | |
|---|---|---|---|---|
| 2,134,022 A * | 10/1938 | Bell | ........................ | D02G 3/28 |
| | | | | 28/258 |
| 2,199,428 A * | 5/1940 | Finlayson | ................ | D02G 1/18 |
| | | | | 57/239 |
| 2,575,753 A * | 11/1951 | Foster | ...................... | D02G 3/34 |
| | | | | 57/239 |
| 7,222,481 B2 | 5/2007 | Esnault | | |
| 7,594,381 B1 * | 9/2009 | Greenberg | ............... | D02G 3/28 |
| | | | | 57/237 |
| 7,810,308 B2 * | 10/2010 | Wang | ..................... | D06M 11/40 |
| | | | | 57/283 |
| 9,617,663 B2 * | 4/2017 | Jeon | ........................ | D02G 3/40 |
| 2009/0294025 A1 | 12/2009 | Michiels | | |
| 2016/0107485 A1 | 4/2016 | Lee | | |
| 2017/0175301 A1 | 6/2017 | Bader | | |
| 2018/0087188 A1 | 3/2018 | Jong De | | |
| 2021/0370719 A1 * | 12/2021 | Yoshizumi | ............. | B60C 9/005 |

FOREIGN PATENT DOCUMENTS

| | | |
|---|---|---|
| CN | 101403154 A | 4/2009 |
| CN | 101994186 A | 3/2011 |
| CN | 104228465 A | 12/2014 |
| EP | 0329592 A2 | 8/1989 |
| EP | 1800901 A2 | 6/2007 |
| JP | 2016-500769 A | 1/2016 |
| JP | 6338291 B2 | 1/2016 |
| JP | 2017-014678 A | 1/2017 |
| JP | 2019163560 A | 9/2019 |
| KR | 1019930010804 B1 | 11/1993 |
| KR | 1020090114588 A | 11/2009 |
| KR | 101233894 B1 | 2/2011 |
| KR | 1020140024508 A | 3/2014 |
| KR | 101406163 B1 | 6/2014 |
| KR | 101602605 B1 | 3/2016 |
| KR | 1020160033851 A | 3/2016 |
| KR | 101740769 B1 | 5/2016 |
| WO | 2009-063913 A1 | 5/2009 |
| WO | 2012-105276 A1 | 8/2012 |
| WO | 2018-062960 A1 | 4/2018 |

OTHER PUBLICATIONS

International Search Report dated May 26, 2020.
Barron E R: "Hybrid Tire Cords Containing Kevlar Aramid", vol. 40, No. 2, Jan. 1, 1987 (Jan. 1, 1987), pp. 130-135, XP002232349.

* cited by examiner

*Primary Examiner* — Grace Huang
(74) *Attorney, Agent, or Firm* — Harvest IP Law, LLP

(57) ABSTRACT

According to the present disclosure, there is disclosed a hybrid tire cord capable of realizing high performance and weight reduction of a tire by having strong adhesion to rubber and excellent fatigue resistance as well as high tenacity and high modulus by providing a cabled yarn in which an aramid hybrid Z-twisted yarn, composed of an aramid multifilament yarn and an aramid spun yarn, and a general-purpose Z-twisted yarn are S-twisted together. There is also provided a method for manufacturing the same.

14 Claims, No Drawings

HYBRID TIRE CORD WITH STRONG ADHESION TO RUBBER AND EXCELLENT FATIGUE RESISTANCE, AND METHOD FOR MANUFACTURING THE SAME

CROSS REFERENCE TO RELATED APPLICATIONS

This application is a National Stage of International Application No. PCT/KR2019/018556 filed Dec. 27, 2019, claiming priority based on Korean Patent Application No. 10-2018-0170216 filed on Dec. 27, 2018.

TECHNICAL FIELD

The present disclosure relates to a hybrid tire cord including different types of yarns having different physical properties, and a preparation method of the same. More specifically, it relates to a hybrid tire cord capable of realizing high performance and weight reduction of a tire by having strong adhesion to rubber and excellent fatigue resistance as well as high tenacity and high modulus, and a method for manufacturing the same.

BACKGROUND OF ART

Fiber cords, especially, fiber cords treated with an adhesive, referred to as "dip cords", are widely used as a reinforcing material for rubber products such as tires, conveyor belts, V-belts and hoses. Materials for the fiber cords include nylon fibers, polyester fibers, rayon fibers, and the like. One of essential methods of improving performance of final rubber products is to improve physical properties of fiber cords used as a reinforcing material.

Fiber cords used as a reinforcing material of a tire is referred to as tire cords. As driving speed of vehicle is gradually increasing in accordance with the improvement of vehicle performance and road conditions, research on tire cords capable of maintaining stability and durability of tires even during high-speed driving is actively being conducted.

In addition, as the demand for eco-friendly vehicles increases, weight reduction of vehicles for high fuel efficiency is emerging as a big issue. Therefore, research on high-performance tire cords for lightening tires is also actively underway.

The tire, which is a composite of fiber/metal/rubber, includes a tread located on the outermost side and in contact with the road, a cap ply under the tread, a belt under the cap ply, and a carcass under the belt.

A hybrid tire cord made of a nylon multifilament and an aramid multifilament has been developed as a tire cord for cap ply to prevent deformation of a belt (e.g., steel belt) during high-speed driving. The nylon-aramid hybrid tire cord is advantageous for preventing deformation of the belt during high-speed driving due to its high shrinkage stress of nylon, and is also advantageous for preventing tire deformation, referred to as "flat spot", caused by long parking due to its high modulus of aramid.

However, the nylon-aramid hybrid tire cord initially exhibits nylon properties on a S-S curve pattern, indicating low modulus. Accordingly, it is not suitable as a tire cord for carcass which functions as a skeleton of the tire and has a great influence on shape stability of the tire.

Accordingly, a polyester-aramid hybrid tire cord, which replaced the nylon multifilament yarn with a polyester (e.g., PET) multifilament yarn having higher modulus than the nylon multifilament yarn, has been developed as a tire cord for carcass.

However, since the aramid multifilament yarn commonly used for the two types of hybrid tire cords has low elongation at break, the polyester-aramid hybrid tire cord has not only low fatigue resistance, but also weak adhesion to rubber, and thus improvement on this is required.

DETAILED DESCRIPTION OF THE INVENTION

Technical Problem

In the present disclosure, there are provided a hybrid tire cord capable of preventing the problems caused by limitations and disadvantages of the related technology as described above, and a method for manufacturing the same.

Accordingly, there is provided a hybrid tire cord capable of realizing high performance and weight reduction of a tire by having strong adhesion to rubber and excellent fatigue resistance as well as high strength and high modulus.

There is also provided a preparation method of a hybrid tire cord capable of realizing high performance and weight reduction of a tire by having strong adhesion to rubber and excellent fatigue resistance as well as high strength and high modulus at high productivity and low cost.

Further features and advantages of the present invention are described below, and will be apparent from such technology. Alternatively, other features and advantages of the present invention may be understood through examples of the present invention. The objects and other advantages of the present invention will be realized and achieved by the structure specified in the detailed description and claims of the invention.

Technical Solution

According to an embodiment of the present disclosure, there is provided a hybrid tire cord including a cabled yarn in which a first Z-twisted yarn formed by Z-twisting a first multifilament yarn and a first spun yarn together; and a second Z-twisted yarn formed by Z-twisting a second multifilament yarn are S-twisted together,
wherein the first multifilament yarn is an aramid multifilament yarn,
the first spun yarn is an aramid spun yarn, and
the second multifilament yarn is a nylon multifilament yarn or a polyester multifilament yarn.

When S-twist of the hybrid tire cord with a certain length is untwisted, a length of the first Z-twisted yarn may be 1.005 to 1.050 times a length of the second Z-twisted yarn.

The first multifilament yarn may have a thickness of 500 to 3000 denier, the first spun yarn may have a thickness of 30 to 8'S, and the second multifilament yarn may have a thickness of 500 to 3000 denier.

Each of the first Z-twisted yarn and the second Z-twisted yarn may have a first twist number.

The first Z-twisted yarn and the second Z-twisted yarn may be S-twisted with a second twist number, and the second twist number may be the same as the first twist number.

A weight ratio of the second Z-twisted yarn to the first Z-twisted yarn may be 20:80 to 80:20.

The hybrid tire cord may further include an adhesive coated on the first Z-twisted yarn and the second Z-twisted yarn.

A tear tenacity measured in accordance with ASTM D885/D885M-10a (2014) may be 8.0 to 15.0 g/d, an elongation at break measured in accordance with ASTM D885/D885M-10a (2014) may be 5 to 15%, and a strength retention rate after disk fatigue test conducted in accordance with JIS-L 1017 (2002) may be 95% or more.

According to another embodiment of the present disclosure, there is provided a preparation method of a hybrid tire cord including: a first step of preparing a hybrid yarn by doubling a first multifilament yarn and a first spun yarn; a second step of preparing a first Z-twisted yarn by Z-twisting the hybrid yarn; a third step of preparing a second Z-twisted yarn by Z-twisting the second multifilament yarn; and a fourth step of preparing a cabled yarn by S-twisting the first Z-twisted yarn and the second Z-twisted yarn together, wherein the first multifilament yarn is an aramid multifilament yarn, the first spun yarn is an aramid spun yarn, and the second multifilament yarn is a nylon multifilament yarn or a polyester multifilament yarn.

The second, third, and fourth steps may performed by one twisting machine.

Tension applied to the hybrid yarn when performing the second, third, and fourth steps may be less than tension applied to the second multifilament yarn so that a length of the first Z-twisted yarn is 1.005 to 1.050 times a length of the second Z-twisted yarn when untwisting S-twist of the hybrid tire cord with a certain length.

Each of the Z-twist of the second step and the Z-twist of the third step may be performed with a first twist number.

The Z-twist of the fourth step may be performed with a second twist number, and the second twist number may be the same as the first twist number.

The first multifilament yarn may have a thickness of 500 to 3000 denier, the first spun yarn may have a thickness of 30 to 8 'S, and the second multifilament yarn may have a thickness of 500 to 3000 denier.

The method may further include the steps of: immersing the cabled yarn in an adhesive solution containing a RFL (Resorcinol Formaldehyde Latex)-based adhesive or an epoxy-based adhesive; drying the cabled yarn impregnated with the adhesive solution at 70 to 200° C. for 30 to 120 seconds; and heat-treating the dried cabled yarn at 200 to 250° C. for 30 to 120 seconds.

It should be understood that both the above general description and the following detailed description are intended to illustrate or describe the present invention, and to provide a more detailed description of the invention of claims.

Advantageous Effects

According to the present invention, a high-performance hybrid tire cord including a cabled yarn in which an aramid hybrid Z-twisted yarn of an aramid multifilament yarn and an aramid spun yarn is S-twisted with a nylon or polyester Z-twisted yarn may be provided. That is, the use of the aramid spun yarn makes it possible to have strong adhesion to rubber and excellent fatigue resistance, thereby achieving high performance and weight reduction of the tire. In addition, since the aramid multifilament yarn is used together with an aramid spun yarn, it is possible to prevent a problem of low elongation at break, and at the same time, the use of the aramid multifilament makes it possible to have high strength and high modulus.

In addition, according to the present disclosure, since the process of forming an aramid hybrid Z-twisted yarn and a nylon or polyester Z-twisted yarn, respectively (i.e., Z-twisting process) and the process of forming a cabled yarn with the aramid hybrid Z-twisted yarn and the nylon or polyester Z-twisted yarn (i.e., S-twisting process) are performed by one twisting machine, it is possible to improve the productivity of the hybrid tire cord and reduce the manufacturing cost.

DETAILED DESCRIPTION OF THE EMBODIMENTS

Hereinafter, embodiments of the hybrid tire cord and the preparation method thereof of the present disclosure will be described in detail.

It will be apparent to those skilled in the art that various changes and modifications of the present invention are possible without departing from the spirit and scope of the present invention. Accordingly, the present invention includes all changes and modifications within the scope of the invention described in claims and their equivalents.

In the present disclosure, the terms "the first" and "the second" are used to describe a variety of components, and these terms are merely employed to distinguish a certain component from other components.

The term "multifilament yarn" as used herein refers to a yarn made of continuous filaments.

The term "spun yarn" as used herein refers to a yarn made by twisting staple fibers in the longitudinal direction.

As used herein, the term "Z-twist" means twisting a yarn in a counterclockwise direction, and the term "S-twist" means twisting a yarn in a clockwise direction.

The term "cabled yarn" as used herein refers to a yarn made by S-twisting two or more Z-twisted yarns, and is also referred to as "raw cord".

The term "tire cord" as used herein is a concept including not only the "raw cord", but also "dip cord" which means a cabled yarn coated with an adhesive so that it can be directly applied to a rubber product.

The "twist number" as used herein refers to the number of twists per 1 m, and the unit is TPM (Twist Per Meter).

In addition, "S" as used herein means English cotton count indicating the thickness of the yarn representing the length of a fixed weight of fibers (constant weight system). Since it is a method of indicating the length per unit weight, larger cotton counts equal thinner yarns, and smaller cotton counts equal thicker yarns. The English cotton count is also referred to as Ne, and the notation of single yarns is 00 (number)'s. The English cotton count is calculated as the number of times the length of 1 lb can be divided by 840 yd as shown in Equation 1 below.

$$\text{Cotton count ('S)} = (\text{length of fiber per 1 lb (yd)}) \div 840 \text{ yd} \qquad \text{[Equation 1]}$$

In addition, the number of cotton count, as is well known, refers to the number of 840 yard (768 m) lengths included in 1 pound (453 g) of cotton yarn, and this case is referred to as count 1. As described above, larger cotton counts mean thinner yarns.

According to an embodiment of the present disclosure, there may be provided a hybrid tire cord including a cabled yarn in which a first Z-twisted yarn formed by Z-twisting a first multifilament yarn and a first spun yarn together; and a second Z-twisted yarn formed by Z-twisting a second multifilament yarn are S-twisted together, wherein the first multifilament yarn is an aramid multifilament yarn, the first spun yarn is an aramid spun yarn, and the second multifilament yarn is a nylon multifilament yarn or a polyester multifilament yarn.

Specifically, the hybrid tire cord of the present disclosure includes a first Z-twisted yarn formed by Z-twisting a first multifilament yarn and a first spun yarn together, and a second Z-twisted yarn formed by Z-twisting a second multifilament yarn. The first Z-twisted yarn and the second Z-twisted yarn are S-twisted together.

In particular, the present disclosure uses an aramid hybrid Z-twisted yarn of an aramid multifilament yarn and an aramid spun yarn, and thus it is possible to solve problems such as low modulus which occurs when nylon properties are first expressed, and low elongation at break due to the use of the aramid multifilament. That is, the aramid spun yarn included in the hybrid Z-twisted yarn makes it possible to have strong adhesion to rubber and excellent fatigue resistance, and thus, high performance and weight reduction of the tire can be realized. In addition, since the aramid multifilament used in the manufacture of the hybrid Z-twisted yarn is used together with the aramid spun yarn, it is possible to prevent degradation of properties. Therefore, it is possible to achieve high strength and high modulus due to the aramid multifilament.

Preferably, according to the present disclosure, the first multifilament yarn is an aramid multifilament yarn, the first spun yarn is an aramid spun yarn, and the second multifilament yarn is a nylon multifilament yarn or a polyester multifilament yarn.

The aramid spun yarn formed by twisting aramid staple fibers linearly can compensate for low adhesion to rubber of the aramid multifilament yarn by enabling physical bonding of the hybrid tire cord of the present disclosure and rubber, and as a result, it is possible to improve the adhesion to rubber of the hybrid tire cord. Therefore, the hybrid tire cord of the present disclosure has higher adhesion to rubber by 10% or more compared to the hybrid tire cord having similar thickness but no aramid spun yarn (i.e., a hybrid tire cord formed of only aramid multifilament yarn and nylon/polyester multifilament yarn).

In addition, according to the present disclosure, the aramid spun yarn present in the hybrid tire cord performs a cushioning function for absorbing external shocks, thereby improving fatigue resistance of the hybrid tire cord.

The aramid multifilament yarn of the present disclosure may be formed of para-aramid or meta-aramid, preferably poly(p-phenylene terephthalamide). The aramid multifilament yarn may have a thickness of 500 to 3000 denier, a tensile strength of 20 g/d or more, and an elongation at break of 3% or more.

The aramid staple fibers used in the preparation of the aramid spun yarn of the present disclosure may also be formed of para-aramid or meta-aramid, preferably poly(p-phenylene terephthalamide). The aramid spun yarn may have a thickness including a count of 30 to 8 'S (corresponding to about 170 to about 660 denier). When the count of the aramid spun yarn is 30 'S or more, the aramid spun yarn is too thin to help improve physical adhesion to rubber. When it is 8 'S or less, there is a problem in that a ratio of the relatively inferior aramid spun yarn is increased, and thus tenacity and elastic modulus are lowered.

The nylon multifilament yarn constituting the second multifilament may be formed of nylon 6 or nylon 66. The polyester multifilament yarn may be formed of polyethylene terephthalate (PET). The second multifilament yarn may have a thickness of 500 to 3000 denier.

The weight ratio of the second Z-twisted yarn to the first Z-twisted yarn may be determined in consideration of both the physical properties of the tire cord and the manufacturing cost. According to an embodiment of the present disclosure, a weight ratio of the second Z-twisted yarn to the first Z-twisted yarn may be 20:80 to 80:20.

The first and second Z-twisted yarns have the same twisting direction (first twisting direction), and may have the same twist number, for example, a first twist number of 200 to 500 TPM.

The first Z-twisted yarn and the second Z-twisted yarn are S-twisted together with a second twist number, and the second twist number may be the same as the first twist number. The S-twisting direction is a direction opposite to the first twisting direction.

According to an embodiment of the present disclosure, when S-twist of the hybrid tire cord with a certain length is untwisted, a length of the first Z-twisted yarn is 1.005 to 1.050 times a length of the second Z-twisted yarn. That is, the hybrid tire cord according to an embodiment of the present disclosure has a merged structure in which a covering structure (the first Z-twisted yarn covers the second Z-twisted yarn) is slightly included.

Therefore, in the hybrid tire cord according to an embodiment of the present disclosure, stress applied to the hybrid tire cord when the tire is repeatedly subjected to tension and contraction may be distributed not only to the first Z-twisted yarn (i.e., aramid Z-twisted yarn) but also to the second Z-twisted yarn (i.e., nylon/polyester Z-twisted yarn), unlike a hybrid cord having a merged structure in which the first Z-twisted yarn and the second Z-twisted yarn have substantially the same length and the same structure (i.e., structure in which a length of the first Z-twisted yarn is less than 1.005 times a length of the second Z-twisted yarn when untwisting S-twist of the hybrid tire cord with a certain length). As a result, the hybrid tire cord of the present disclosure has excellent fatigue resistance.

If a length of the first Z-twisted yarn is more than 1.050 times a length of the second Z-twisted yarn when untwisting S-twist of the hybrid tire cord with a certain length, it has an unstable structure similar to the covering structure of the prior art, thereby increasing the defect rate of the tire due to variation in physical properties.

The hybrid tire cord according to an embodiment of the present disclosure may be a dip cord further including an adhesive coated on the first Z-twisted yarn and the second Z-twisted yarn in order to improve adhesion to other components (e.g., rubber) of the tire. The adhesive may be a RFL (Resorcinol Formaldehyde Latex)-based adhesive or an epoxy-based adhesive.

The dip cord may have a tear tenacity measured in accordance with ASTM D885/D885M-10a (2014) of 8.0 to 15.0 g/d, an elongation at break measured in accordance with ASTM D885/D885M-10a (2014) of 5 to 15%, and a strength retention rate after disk fatigue test conducted in accordance with JIS-L 1017 (2002) of 95% or more.

In addition, the dip cord may have a dry heat shrinkage of 0.3 to 2.5% (temperature: 180° C., primary load: 0.01 g/d, time: 2 minutes). The dry heat shrinkage is measured under a primary load of 0.01 g/denier at 180° C. for 2 minutes using testrite after leaving the sample at a temperature of 25° C. and a relative humidity of 65% for 24 hours.

Hereinafter, the preparation method of the above-described hybrid tire cord will be described in more detail.

According to another embodiment of the present disclosure, there is provided a preparation method of a hybrid tire cord including: a first step of preparing a hybrid yarn by doubling a first multifilament yarn and a first spun yarn; a second step of preparing a first Z-twisted yarn by Z-twisting the hybrid yarn; a third step of preparing a second Z-twisted yarn by Z-twisting the second multifilament yarn; and a fourth step of preparing a cabled yarn by S-twisting the first Z-twisted yarn and the second Z-twisted yarn together, wherein the first multifilament yarn is an aramid multifilament yarn, the first spun yarn is an aramid spun yarn, and the second multifilament yarn is a nylon multifilament yarn or a polyester multifilament yarn.

As described above, the first multifilament yarn is an aramid multifilament yarn, the first spun yarn is an aramid spun yarn, and the second multifilament yarn is a nylon multifilament yarn or a polyester multifilament yarn.

The aramid multifilament yarn may be formed of para-aramid or meta-aramid, preferably poly(p-phenylene terephthalamide).

The aramid staple fibers used in the preparation of the aramid spun yarn may also be formed of para-aramid or meta-aramid, preferably poly(p-phenylene terephthalamide).

The nylon multifilament yarn may be formed of nylon 6 or nylon 66, and the polyester multifilament yarn may be formed of polyethylene terephthalate (PET). The second multifilament yarn may have a thickness of 500 to 3000 denier.

According to an embodiment of the present disclosure, an aramid hybrid yarn is formed by doubling an aramid multifilament yarn having a thickness of 500 to 3000 denier and an aramid spun yarn having a thickness including a count of 30 to 8 'S (corresponding to about 170 to about 660 denier).

Subsequently, the aramid hybrid yarn is introduced with a nylon or polyester multifilament yarn having a thickness of 500 to 3000 denier to a cable cord twisting machine (e.g., Cable Corder manufactured by Allma) capable of performing both the Z-twisting and S-twisting.

In the twisting machine, a step of Z-twisting the aramid hybrid yarn to form the aramid Z-twisted yarn and a step of Z-twisting the nylon or polyester multifilament yarn to form the nylon/polyester Z-twisted yarn are simultaneously performed, and a step of S-twisting the aramid Z-twisted yarn and the nylon/polyester Z-twisted yarn together to form a cabled yarn is continuously performed following the above Z-twisting steps.

As described above, when performing the Z-twisting and S-twisting, the same twist number may be applied within the range of 200 to 500 TPM.

Since the cabled yarn is prepared by a continuous method in which the Z-twisting and the S-twisting are performed in one twisting machine in the present disclosure, the productivity of the hybrid tire cord may be further improved compared to a batch method in which an aramid multifilament yarn and a nylon/polyester multifilament yarn are Z-twisted using a twisting machine, respectively, and then S-twisted together using another twisting machine.

According to an embodiment of the present disclosure, when Z-twisting and S-twisting are performed by the twisting machine, the tension applied to the hybrid yarn (i.e., aramid hybrid yarn) is less than the tension applied to the second multifilament yarn (i.e., nylon/polyester multifilament yarn). Therefore, although the Z-twisting and S-twisting are performed by one twisting machine, when S-twist of the hybrid tire cord with a certain length is untwisted, the length of the aramid Z-twisted yarn may be slightly longer than the length of the nylon/polyester Z-twisted yarn. Through this, stress applied to the hybrid tire cord when the tire is repeatedly subjected to tension and contraction may be distributed to the aramid Z-twisted yarn and the nylon/polyester Z-twisted yarn, and the hybrid tire cord may have excellent fatigue resistance, so that stability of the tire can be maintained even in long high-speed driving.

According to an embodiment of the present disclosure, the difference between the tension applied to the hybrid yarn (i.e., aramid hybrid yarn) and the tension applied to the second multifilament yarn (i.e., nylon/polyester multifilament yarn) may be a difference so that the length of the first Z-twisted yarn (i.e., aramid hybrid yarn) is 1.005 to 1.050 times the length of the second Z-twisted yarn (i.e., nylon/polyester multifilament yarn) when S-twist of the hybrid tire cord with a certain length is untwisted.

The tension applied to each of the hybrid yarn (i.e., aramid hybrid yarn) and the second multifilament yarn (i.e., nylon/polyester multifilament yarn) when the Z-twisting and the S-twisting are performed by the twisting machine may be adjusted by appropriately setting 'Creel Yarn Tension' and 'Inner Yarn Tension' of the twisting machine (Cable Corder manufactured by Allma).

In the case of preparing a dip cord rather than a raw cord, the steps of immersing the cabled yarn in an adhesive solution containing a RFL (Resorcinol Formaldehyde Latex)-based adhesive or an epoxy-based adhesive; drying the cabled yarn impregnated with the adhesive solution; and heat-treating the dried cabled yarn may be further performed in order to improve adhesion to other components of the tire (e.g., rubber).

The temperature and time of the drying process may vary depending on the composition of the adhesive solution, but the drying process is typically performed at 70 to 200° C. for 30 to 120 seconds.

The heat treatment process may be performed at 200 to 250° C. for 30 to 120 seconds.

The immersion step, drying step, and heat treatment step may be continuously performed with a roll-to-roll process.

In order to prevent excessive shrinkage of the second multifilament yarn in the process of drying and heat treatment after the cabled yarn (raw cord) prepared by the twisting machine is immersed in an adhesive solution, the tension applied to the cabled yarn (raw cord) in the continuously-performed immersion, drying, and heat treatment steps is appropriately adjusted.

Hereinafter, the effects of the present invention will be described with specific examples and comparative examples. However, the following examples are only for helping the understanding of the present invention, and these do not limit the scope of the present invention.

Example 1

An aramid hybrid yarn was prepared by doubling 1000 denier of an aramid[poly(p-phenylene terephthalamide)] multifilament yarn and 20 'S of an aramid[poly(p-phenylene terephthalamide)] spun yarn.

Subsequently, the aramid hybrid yarn and 840 denier of a nylon 66 multifilament yarn were put into a cable cord twisting machine (Cable Corder manufactured by Allma), and Z-twisting and S-twisting were respectively performed with a twist number of 360 TPM to prepare a cabled yarn. By adjusting the tension applied to each of the aramid hybrid yarn and the nylon 66 multifilament yarn when performing the Z-twisting and S-twisting, the ratio (i.e., $L_A/L_N$) of a length ($L_A$) of the Z-twisted aramid yarn to a length ($L_N$) of the nylon 66 Z-twisted yarn in the cabled yarn was 1.03.

Subsequently, the cabled yarn was immersed in a Resorcinol-Formaldehyde-Latex (RFL) adhesive solution. The cabled yarn impregnated with the RFL adhesive solution was dried at 150° C. for 100 seconds, and heat-treated at 240° C. for 100 seconds to complete a hybrid tire cord.

Example 2

A hybrid tire cord was completed in the same manner as in Example 1, except that the thickness of the nylon 66 multifilament yarn was 1260 denier.

Example 3

A hybrid tire cord was completed in the same manner as in Example 2, except that the thickness of the aramid multifilament yarn was 1500 denier, and the Z-twisting and S-twisting were respectively performed with a twist number of 300 TPM.

Example 4

A hybrid tire cord was completed in the same manner as in Example 3, except that the thickness of the aramid spun yarn was 16 'S.

Example 5

A hybrid tire cord was completed in the same manner as in Example 1, except that 1000 denier of a PET multifilament yarn was used instead of the nylon 66 multifilament yarn, and the Z-twisting and S-twisting were respectively performed with a twist number of 460 TPM.

Example 6

A hybrid tire cord was completed in the same manner as in Example 4, except that 1500 denier of a PET multifilament yarn was used instead of the nylon 66 multifilament yarn.

Comparative Example 1

A hybrid tire cord was completed in the same manner as in Example 1, except that the aramid multifilament yarn was not doubled with the aramid spun yarn, but was introduced into the cable cord twisting machine together with the nylon 66 multifilament yarn to perform Z-twisting and S-twisting, respectively.

Comparative Example 2

A hybrid tire cord was completed in the same manner as in Comparative Example 1, except that the thickness of the nylon 66 multifilament yarn was 1260 denier.

Comparative Example 3

A hybrid tire cord was completed in the same manner as in Comparative Example 2, except that the thickness of the aramid multifilament yarn was 1500 denier, and the Z-twisting and S-twisting were respectively performed with a twist number of 300 TPM.

Comparative Example 4

A hybrid tire cord was completed in the same manner as in Comparative Example 1, except that 1000 denier of a PET multifilament yarn was used instead of the nylon 66 multifilament yarn, and the Z-twisting and S-twisting were respectively performed with a twist number of 460 TPM.

Comparative Example 5

A hybrid tire cord was completed in the same manner as in Comparative Example 3, except that 1500 denier of a PET multifilament yarn was used instead of the nylon 66 multifilament yarn.

Experimental Examples

The (i) strength, (ii) tear tenacity, (iii) elongation at break, (iv) adhesion to rubber, and (v) strength retention rate after disk fatigue test of hybrid tire cords obtained in Examples and Comparative Examples were measured by the following methods, and the results are shown in Table 1.

*Strength (kgf), Tear Tenacity, Elongation at Break

Ten 250 mm-length samples were prepared for each hybrid tire cord. Then, the strength, tear tenacity and elongation at break of each sample were measured in accordance with the ASTM D885/D885M-10a (2014) test method by applying a tensile testing speed of 300 m/min to each sample using an Instron Tester (Instron Engineering Corp., Canton, Mass). Thereafter, the average values of the 10 samples for the strength, tear tenacity and elongation at break were calculated, respectively.

*Adhesion to Rubber

The adhesion to rubber of the hybrid tire cord was measured in accordance with the H-Test method specified in ASTM D885/D885M-10a (2014).

*Strength Retention Rate After Disk Fatigue Test

A sample was prepared by curing rubber with a hybrid tire cord whose strength (strength before fatigue) was measured, and subjected to fatigue by repeating tension and contraction within the range of −8% to +8% for 16 hours while rotating at 2500 rpm and 80° C. using a disk fatigue tester in accordance with the JIS-L 1017 (2002) test method. Subsequently, after removing the rubber from the sample, the strength after fatigue of the hybrid tire cord was measured. With the strength before fatigue and the strength after fatigue, the strength retention rate defined by the following Equation 2 was calculated.

$$\text{Strength retention rate (\%)} = [\text{strength after fatigue (kgf)/strength before fatigue (kgf)}] \times 100 \quad \text{[Equation 2]}$$

Herein, the strength (kgf) before and after fatigue were obtained by measuring tear strength of the hybrid tire cord while applying a tensile testing speed of 300 m/m in to a 250 mm sample in accordance with the ASTM D885/D885M-10a (2014) test method using an Instron Tester (Instron Engineering Corp., Canton, Mass).

TABLE 1

| | First Z-twisted yarn | | Second Z-twisted yarn | | Physical properties | | | | | |
|---|---|---|---|---|---|---|---|---|---|---|
| | Thickness of aramid MFY* (de) | Thickness of aramid SY** ('S) | Thickness of nylon 66 MFY (de) | Thickness of PET MFY (de) | Twist number (TPM) | Strength (kgf) | Tear tenacity (g/d) | Elongation at break (%) | Adhesion to rubber (kgf) | Strength retention rate (%) |
| Ex. 1 | 1000 | 20 | 840 | — | 360 | 24.7 | 11.7 | 9.1 | 14.7 | 95.2 |
| Ex. 2 | 1000 | 20 | 1260 | — | 360 | 28.4 | 11.2 | 10.8 | 16.3 | 96.7 |
| Ex. 3 | 1500 | 20 | 1260 | — | 300 | 38.6 | 12.7 | 12.4 | 17.5 | 96.4 |
| Ex. 4 | 1500 | 16 | 1260 | — | 300 | 38.1 | 12.3 | 14.6 | 17.8 | 97.0 |
| Ex. 5 | 1000 | 20 | — | 1000 | 460 | 25.8 | 11.4 | 7.6 | 14.9 | 96.6 |
| Ex. 6 | 1500 | 16 | — | 1500 | 300 | 36.6 | 11.0 | 7.0 | 18.7 | 98.4 |
| Comp. Ex. 1 | 1000 | — | 840 | — | 360 | 24.5 | 13.3 | 8.6 | 12.1 | 90.3 |
| Comp. Ex. 2 | 1000 | — | 1260 | — | 360 | 27.6 | 12.2 | 10.2 | 13.4 | 91.2 |
| Comp. Ex. 3 | 1500 | — | 1260 | — | 300 | 37.1 | 13.4 | 11.5 | 14.5 | 93.0 |
| Comp. Ex. 4 | 1000 | — | — | 1000 | 460 | 25.5 | 12.8 | 7.5 | 12.7 | 89.1 |
| Comp. Ex. 5 | 1500 | — | — | 1500 | 300 | 36.2 | 12.1 | 6.9 | 14.4 | 84.6 |

*MFY: Multifilament yarn
**SY: Spun yarn

Referring the results of Table 1, Examples 1 to 6 were all superior in strength, tear tenacity and elongation at break compared to Comparative Examples 1 to 5 by using a Z-twisted yarn in which an aramid spun yarn was used together with an aramid multifilament. In particular, Examples 1 to 6 of the present disclosure exhibited remarkably superior adhesion to rubber and strength retention rate compared to Comparative Examples, and fatigue resistance was improved, thereby achieving high performance and weight reduction of a tire.

On the other hand, Comparative Examples 1 to 5 exhibited poor adhesion to rubber as well as poor strength retention rate, resulting in poor fatigue resistance due to low elongation at break of the aramid multifilament yarn, although they may exhibit a certain level of strength and tenacity.

The invention claimed is:

1. A hybrid tire cord comprising a cabled yarn in which a first Z-twisted yarn, formed by Z-twisting a first multifilament yarn and a first spun yarn together, and a second Z-twisted yarn, formed by Z-twisting a second multifilament yarn, are S-twisted together,
   wherein the first multifilament yarn is an aramid multifilament yarn,
   the first spun yarn is an aramid spun yarn, and
   the second multifilament yarn is a nylon multifilament yarn or a polyester multifilament yarn.

2. The hybrid tire cord of claim 1,
   wherein when S-twist of the hybrid tire cord with a certain length is untwisted, a length of the first Z-twisted yarn is 1.005 to 1.050 times a length of the second Z-twisted yarn.

3. The hybrid tire cord of claim 1,
   wherein each of the first Z-twisted yarn and the second Z-twisted yarn has a first twist number.

4. The hybrid tire cord of claim 1,
   wherein the first Z-twisted yarn and the second Z-twisted yarn are S-twisted with a second twist number, and the second twist number is the same as the first twist number.

5. The hybrid tire cord of claim 1,
   wherein the first multifilament yarn has a thickness of 500 to 3000 denier,
   the first spun yarn has a thickness of 30 to 8 'S, and
   the second multifilament yarn has a thickness of 500 to 3000 denier.

6. The hybrid tire cord of claim 1,
   wherein a weight ratio of the second Z-twisted yarn to the first Z-twisted yarn is 20:80 to 80:20.

7. The hybrid tire cord of claim 1,
   further comprising an adhesive coated on the first Z-twisted yarn and the second Z-twisted yarn.

8. A preparation method of a hybrid tire cord comprising:
   a first step of preparing a hybrid yarn by doubling a first multifilament yarn and a first spun yarn;
   a second step of preparing a first Z-twisted yarn by Z-twisting the hybrid yarn;
   a third step of preparing a second Z-twisted yarn by Z-twisting a second multifilament yarn; and
   a fourth step of preparing a cabled yarn by S-twisting the first Z-twisted yarn and the second Z-twisted yarn together,
   wherein the first multifilament yarn is an aramid multifilament yarn,
   the first spun yarn is an aramid spun yarn, and
   the second multifilament yarn is a nylon multifilament yarn or a polyester multifilament yarn.

9. The preparation method of a hybrid tire cord of claim 8,
   wherein the second, third, and fourth steps are performed by one twisting machine.

10. The preparation method of a hybrid tire cord of claim 8,
    wherein tension applied to the hybrid yarn when performing the second, third, and fourth steps is less than tension applied to the second multifilament yarn so that a length of the first Z-twisted yarn is 1.005 to 1.050 times a length of the second Z-twisted yarn when untwisting the S-twist of the hybrid tire cord.

11. The preparation method of a hybrid tire cord of claim 8, wherein each of the Z-twist of the second step and the Z-twist of the third step is performed with a first twist number.

12. The preparation method of a hybrid tire cord of claim 11,
wherein the Z-twist of the fourth step is performed with a second twist number, and
the second twist number is the same as the first twist number.

13. The preparation method of a hybrid tire cord of claim 8,
wherein the first multifilament yarn has a thickness of 500 to 3000 denier,
the first spun yarn has a thickness of 30 to 8 'S, and
the second multifilament yarn has a thickness of 500 to 3000 denier.

14. The preparation method of a hybrid tire cord of claim 8,
further comprising the steps of: immersing the cabled yarn in an adhesive solution containing an RFL (Resorcinol Formaldehyde Latex)-based adhesive or an epoxy-based adhesive;
drying the cabled yarn impregnated with the adhesive solution at 70 to 200° C. for 30 to 120 seconds; and
heat-treating the dried cabled yarn at 200 to 250° C. for 30 to 120 seconds.

* * * * *